United States Patent [19]

Blandine et al.

[11] Patent Number: 5,447,737
[45] Date of Patent: Sep. 5, 1995

[54] PEPPER CORING PROCESS AND APPARATUS

[75] Inventors: James A. Blandine, Ringwood; Alexander S. Cascione, Pequannock, both of N.J.; Thomas J. Van Dixhorn, Thousand Oaks; Clyde D. Watson, Sea Isle, both of Calif.

[73] Assignee: Nabisco, Inc., Parsippany, N.J.

[21] Appl. No.: 265,177

[22] Filed: Jun. 24, 1994

[51] Int. Cl.⁶ .................. A23L 1/00; B26D 1/00
[52] U.S. Cl. .................. 426/484; 99/544; 99/557; 426/482
[58] Field of Search .............. 426/484, 481, 482; 99/544, 557

[56] References Cited

U.S. PATENT DOCUMENTS

| | | | |
|---|---|---|---|
| 2,683,477 | 6/1954 | Altman | 99/547 |
| 2,688,993 | 9/1954 | White | 99/544 |
| 2,835,294 | 5/1958 | Rigney | 99/547 |
| 3,434,517 | 3/1969 | Durand, Jr. et al. | 99/544 |
| 3,563,289 | 2/1971 | Altman | 99/563 |
| 4,252,056 | 2/1981 | Altman | 99/551 |
| 4,337,693 | 7/1982 | Dandrea | 99/491 |
| 5,390,590 | 2/1995 | Mendenhall | 99/544 |

FOREIGN PATENT DOCUMENTS

| | | |
|---|---|---|
| 344836 | 8/1972 | U.S.S.R. |
| 1331478 | 8/1987 | U.S.S.R. |
| 9313678 | 7/1993 | WIPO |

OTHER PUBLICATIONS

Derwent Abstract No. 73-53349U/37 abstracting Soviet Union Patent Publication 367845.
Derwent Abstract No. 77-53612Y/30 abstracting Soviet Union Patent Publication 540622.

*Primary Examiner*—George Yeung

[57] ABSTRACT

Cut, cooked peppers, substantially free of core portions, are prepared. Cooked peppers are distributed to form an essentially single layer on a suitable support such as a conveyor. They are cut both parallel to and transversely to the direction of movement of the support. The support, holding pieces of flesh and core, is moved relative to a plurality of pins to impale both. The pins are preferentially withdrawn from the pieces of flesh and remain impaled within the cores, thereby separating one from the other. In its more comprehensive aspects, the process includes the further steps of: roasting the peppers whole, including core, stem and calyx, to provide roasted peppers; and washing and tumbling the peppers after roasting to separate skins therefrom. Desirably, the pieces of flesh are acidified, diced and packaged, after separation of the cores.

24 Claims, 6 Drawing Sheets

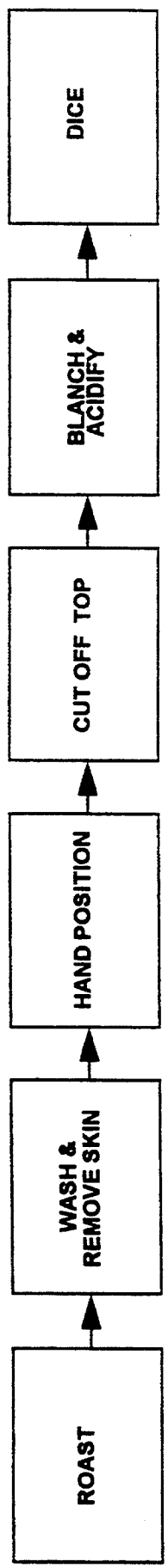
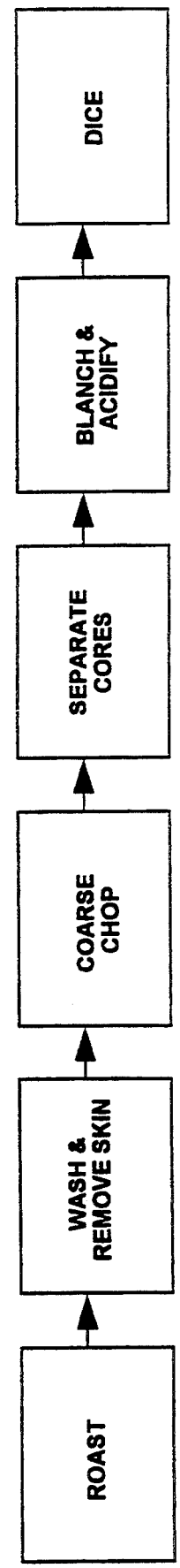

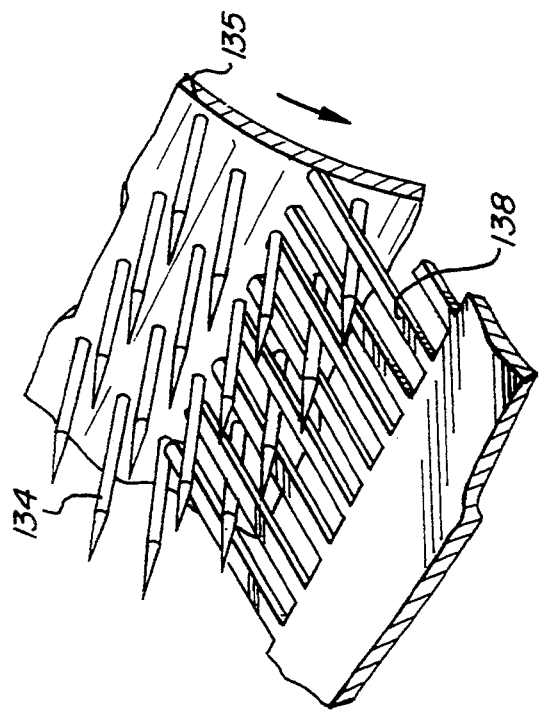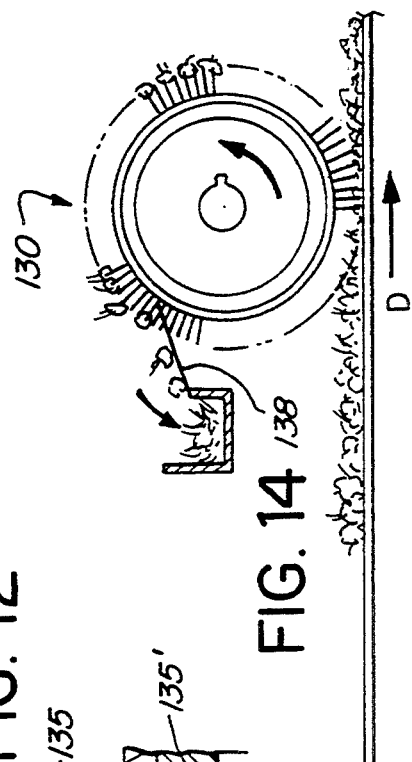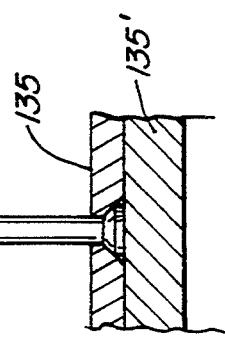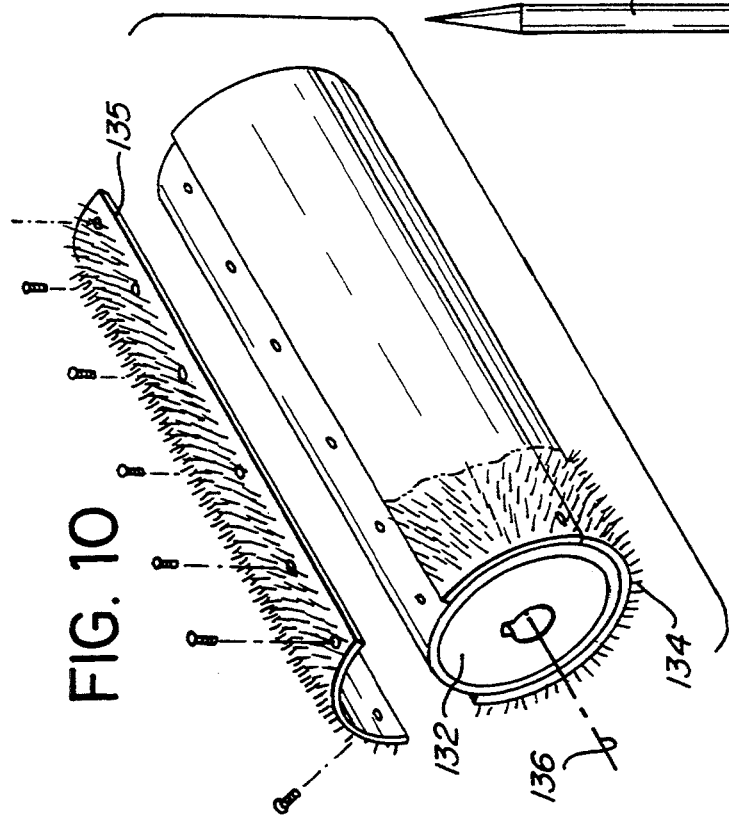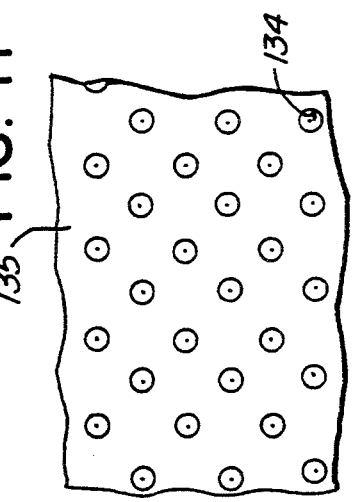

PEPPER CORING PROCESS AND APPARATUS

TECHNICAL FIELD

The invention relates to an improved process and apparatus for removing the core and other less desirable portions of peppers, particularly long and irregularly-shaped peppers such as jalapna and chili peppers.

Peppers are picked when ripe and must be packaged (typically, pickled) soon thereafter. This provides only a narrow time window. Thus, large volumes of peppers must be packaged in very short periods of time. Mechanization has not, however, been possible to the extent desired.

Many varieties of peppers have odd, oblong shapes and often have bends and twists which, in addition to great variations in size, make it very difficult to design machinery to remove cores and stems. The current practice for coring irregularly-shaped peppers is highly labor intensive, requiring each pepper to be picked up and positioned in the proper orientation on a conveyor which feeds them to a cutting station. There is a need for an apparatus and a method that will facilitate core removal at high rates and with a minimum of labor, consistent with the highly seasonal nature of the pepper packing business.

BACKGROUND ART

The art of removing cores from peppers has provided a variety of systems which generally require significant human intervention and/or require highly sophisticated apparatus which may not be suitable for lots of peppers which have irregular shapes and/or wide variations in size.

In U.S. Pat. No. 2,683,477, E. Altman describes an apparatus for coring pimento peppers. The device includes tubular coring knives which are moved into contact with individually positioned peppers and rotated to cut out the core. And, also in U.S. Pat. No. 2,688,993, White describes a coring apparatus which also utilizes a rotatable coring tube and requires manual placement of pimento peppers in a holding cup. Also requiring manual seating of a pimento pepper and the use of a rotating cutting unit, is the apparatus of Rigney in U.S. Pat. No. 2,835,294. Again, in U.S. Pat. No. 3,434,517, Durand, et al. require manual placement of pimento peppers into cup-shaped holders. This is also required by J. E. Altman in U.S. Pat. No. 3,563,289.

In U.S. Pat. No. 4,252,056, J. E. Altman describes a fruit coring apparatus wherein fruit are supported in cups carried by a conveyor with transverse slats. The conveyor indexes a row of fruit beneath a coring station having two vertically reciprocating carriages. One carriage supports a row of coring knives rotated by a common motor and aligned with the fruit-holding cups. The second carriage supports ejector rods which extend axially through each coring tube. In an example, the coring tubes are articulated to grasp the core of the fruit when the coring knife is removed. The apparatus cores fruit including bell peppers.

In U.S. Pat. No. 4,337,693, Dandria describes a pepper coring and slicing apparatus which includes a conveyor with parallel upstanding plates between which a pepper is clamped with its stem uppermost and the pepper axis vertical. A coring tube is moved downwardly through the pepper and includes a stripper which causes the core to remain within the pepper. A lower slicing knife is raised through the conveyor to make a partial diametrical cut. Two upper knives are lowered through the pepper and lie coplanar with the lower knife so as to complete the diametrical cut. At a discharge station, the conveyor clamping plates separate to release the pepper. The apparatus removes the core from a pepper and makes a diametrical cut through the remaining flesh.

In Soviet Union Patent Publication 1,331,478, there is disclosed a machine for cutting cores out of fruits. The apparatus includes a feed unit, an orienting mechanism, a chain conveyor with guides supporting cup-like fruit holders, and tubular coring knives which rotate in a wheel supporting one end of the conveyor. Once properly positioned in the holders, tubular knives having rotary/reciprocatory motion, and ejectors remove the core or heart of fruits such as peppers.

In Soviet Union Patent Publication 540,622, an apparatus is disclosed which holds peppers stationary for removal of the cores while in holders fastened to a conveyor. The holders are made from plates with holes, adjoining each of which are two parallel guiding troughs. These are established with a gap between them so that they form channels. The fruit can be discharged by fastening the holders to the conveyors by means of supports. In the gaps between the troughs, ejectors with rollers on their ends are located, so that they are free to move. The supports have grooves to accommodate the rollers.

In Soviet Union Patent Publication 367,845, a pepper coring unit is described which comprises a housing with the hollow cylinder including cutting blades that are both rotated and reciprocated. The cylinder carries a ring with a whip which is reciprocated along the cylinder and with the whip inserted into the pepper fruit. Elimination of whip deflection during the insertion into the fruit is ensured by placing it in a tube, which is cut off on one side and attached to the housing.

In Soviet Union Patent Publication 344,836, a pepper corer is described with a reciprocating and rotating cutting cylinder. The cylinder is enclosed in a fixed conical casing narrowed at the bottom. The cylinder is divided into separate sprung sectors, in the top of each of which is a frame with freely-mounted ball, interacting with the body as the cylinder reciprocates. The cutting blades are on two diametrically-opposed sectors, at the bottom. This provides for dealing with peppers of various sizes. Rubber limiters may be fitted to limit the depth of cut. An annular groove may be made at the top of the sectors.

In WO 93/13678, there is disclosed a process for preparing roasted, peeled peppers which entails disinfecting and rinsing peppers, separating fruitstalks and the seeds, baking, and separating the peel from the pulp. By operating in this sequence, the step of removing the core cannot be done without disinfecting, and the step of removing the skin becomes more complicated.

In U.S. Pat. No. 4,252,056, J. E. Altman describes a fruit coring apparatus wherein fruit are supported in cups carried by a conveyor with transverse slats. The conveyor indexes a row of fruit beneath a coring station having two vertically reciprocating carriages. One carriage supports a row of coring knives rotated by a common motor and aligned with the fruit-holding cups. The second carriage supports ejector rods which extend axially through each coring tube. In an example, the coring tubes are articulated to grasp the core of the fruit when the coring knife is removed. The apparatus cores fruit including bell peppers.

Despite the development of a wide variety of pepper coring devices developed over the years, investigations of commercial equipment revealed that there was no suitable apparatus or method available that would facilitate core removal at high rates with a minimum of labor, consistent with the highly seasonal nature of the pepper packing business.

BRIEF DESCRIPTION OF THE DRAWINGS

The invention will be better understood and its advantages will be better appreciated from the following detailed description, especially when read in connection with the accompanying drawings, wherein:

FIG. 1 is a process flow diagram of a pepper preparation process as operated prior to the development of the present invention;

FIG. 2 is a process flow diagram of a pepper preparation process according to the present invention;

FIG. 10 is a partially-exploded perspective view of one of the separation devices illustrated in FIG. 5;

FIG. 11 is a top plan view of a section of the separation device illustrated in FIG. 10 to show the arrangement of pins;

FIG. 12 is a detail view of one pin which comprises the separation device shown in FIG. 10;

FIG. 13 shows the detail of comb-like devices for removing waste pieces from the pins; and FIG. 14 is a side elevational view, partially in section, showing the operation of one separation station illustrated in FIG. 5.

DISCLOSURE OF THE INVENTION

Figure 3:
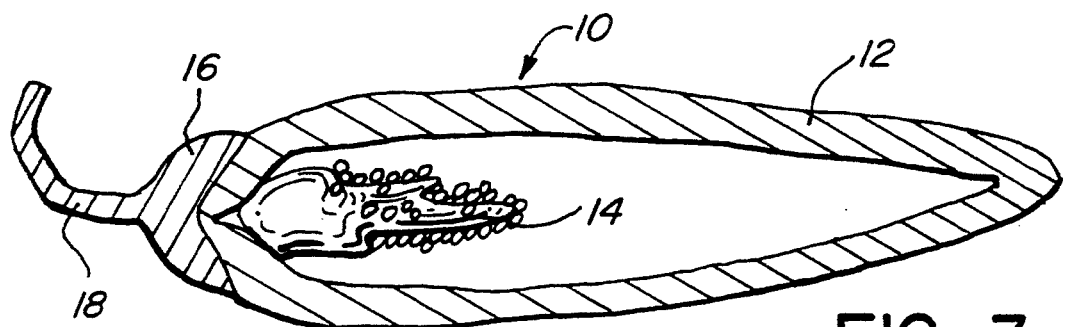
FIG. 3 is a cross-sectional view of a chili pepper showing the core, stem, calyx, and flesh.

It is an object of the invention to provide an improved process and apparatus for removing the core and other less desirable portions of peppers, particularly long and irregularly-shaped peppers such as jalapna and chili peppers.

It is an object of the invention to provide an improved process and apparatus for removing the core and other less desirable portions from varieties of peppers having odd, oblong shapes which are fed in lots which show large variations in size.

It is an object of the invention to provide an improved process and apparatus for removing the core and other less desirable portions from peppers in a manner less labor intensive than the prior art.

It is an object of the invention to provide an improved process and apparatus for removing the core and other less desirable portions from peppers without requiring each pepper to be picked up and positioned in the proper orientation for processing.

It is another object of the invention to provide an apparatus and a method that will facilitate core removal at high rates and with a minimum of labor, consistent with the highly seasonal nature of the pepper packing business.

It is yet another object of the invention to provide an apparatus and a method that will facilitate core removal from varieties of peppers having odd, oblong shapes which are fed in lots which show large variations in size, at high rates and with a minimum of labor, consistent with the highly seasonal nature of the pepper packing business and without requiring each pepper to be picked up and positioned in the proper orientation for processing.

These and other objects are realized by the present invention which provides both improved processes and apparatus for preparing cut, cooked peppers, substantially free of core portions. The process comprises: moving a support holding cut, cooked peppers, containing pieces of flesh and core, relative to a plurality of pins having tips to cause said tips of said pins to impale said pieces of flesh and cores; and then moving said support for said cut, cooked peppers, relative to said pins to cause said pins to preferentially withdraw from said pieces of flesh and to remain impaled within said cores, thereby separating said flesh from said cores. Preferably, means are provided for mechanically removing said cores from said pins.

In the preferred form of the apparatus of the invention, as shown in the attached drawings, the support for the cut, cooked peppers comprises an endless belt having a top surface moving linearly, the pins are rotated in a circle about an axis transverse to the direction of movement of the support, and the belt and the tips of the pins are moved at the same linear velocity at the point where the belt is parallel to a tangent to the circle of movement of the tips of the pins. Preferably, the peppers are distributed on the support to form an essentially single layer of the roasted peppers; and the peppers are cut both parallel to and transversely to the direction of movement of the support. Also preferably, the cooked, cut peppers are conveyed past two sets of rotary-mounted pins.

In its more comprehensive aspects, the process includes the further steps of: roasting the peppers whole, including stems and calyx, to provide roasted peppers; and washing and tumbling the peppers after roasting to separate skins therefrom. Desirably, the pieces of flesh are acidified, diced and packaged, after separation from the pieces of cores.

Industrial Applicability

The invention will be described below with specific reference to a preferred embodiment wherein cut, cooked peppers, substantially free of core portions, are prepared. This description addresses the preferred commercial embodiment, which is the preparation of pickled and diced, canned peppers. While the process is applicable to peppers of virtually all varieties, including chili, jalapna, bell, pimento, espanola, pasilla, mirasol, cascabel, ancho, cherry, yellow wax, serrano, sweet banana, and the like, this description will focus on chili peppers of the variety known as Anaheim. FIG. 3 is a cross-sectional representation which illustrates the principal parts of this type of pepper. The pepper, shown generally as 10 is seen to have a flesh portion 12, a core 14 which also includes seeds, a calyx 16, and a stem 18. The invention simply and economically separates the flesh from substantially all of the waste portions—including the core, stem and calyx.

The process of the invention is a major improvement from the prior art process illustrated in FIG. 1. By comparing the prior art process, shown in FIG. 1, with the process of the invention, shown in FIG. 2, it can be seen that the initial and final steps remain the same and that the improvements offered by the invention enable mechanization of core removal.

The prior art procedure illustrated in FIG. 1 starts by roasting the peppers in large, rotary, gas-fired roasters. The peppers are fed into an elevated end of the roaster and tumbled therein as a gas flame roasts the flesh and loosens the skin. After discharge from the opposite end of the roaster, the peppers are conveyed to a series of rotary washers which tumble the peppers and wash them with water as they are advanced through the washers. The tumbling within the washers also removes the skins which have already been loosened by the roasting. Then, each pepper is picked up by hand and placed on a moving conveyor in the proper orientation for the top—including a portion of the flesh as well as core, stem and calyx—to be severed as the belt moves the peppers past a cutting station. Following removal of the tops, the peppers are then blanched and acidified prior to dicing to the desired size, e.g. about ⅜ inch squares, as is known in the art.

The process of the invention speeds the middle part of the process and reduces the size of the conveyor system needed. The flow diagram of FIG. 2 brings out the improvements. Following washing, the peppers are cut into relatively large sections. The cores are separated from the desirable flesh portions by a series of pins which are able to stick in and hold the core, stem and calyx sections, while they simply withdraw from the cooked flesh portions. This will be better understood by reference to FIGS. 4 and 5 and the discussion below.

Cooked peppers 10 are distributed to form an essentially single layer on a suitable support such as conveyor 100. They are cut both transversely to (at cutting station 110) and parallel to (at cutting station 120) the direction D of movement of the support. The support, holding pieces of flesh and waste, is moved relative to a plurality of pins (at stations 130, 140 and 150) to impale both. The pins are preferentially withdrawn from the pieces of flesh and remain impaled within the cores and other waste, thereby separating one from the other. Then, as in the prior art, the pieces of flesh are acidified, diced and packaged (by means not shown).

Figure 4:
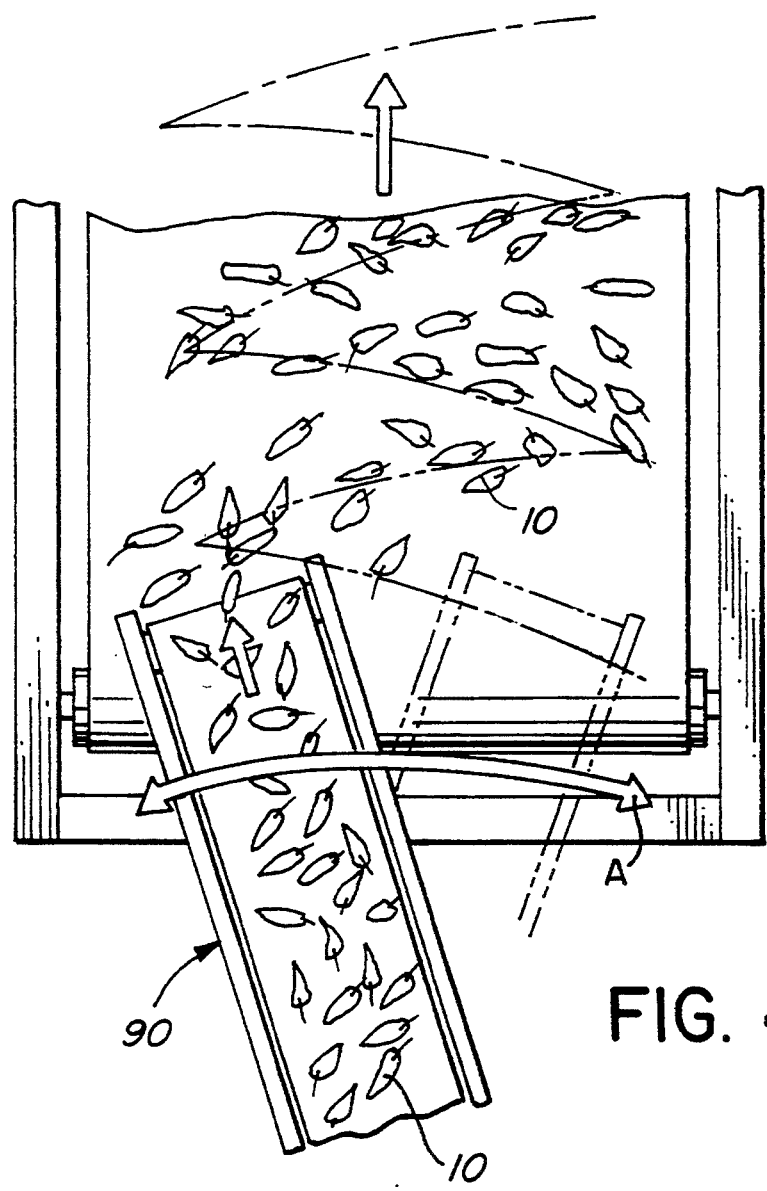
FIG. 4 is a top plan view illustrating the spreading of cooked peppers onto a conveyor leading to the cutters where the peppers are coarsely chopped prior to separating the flesh from waste according to the invention.
Figure 5:
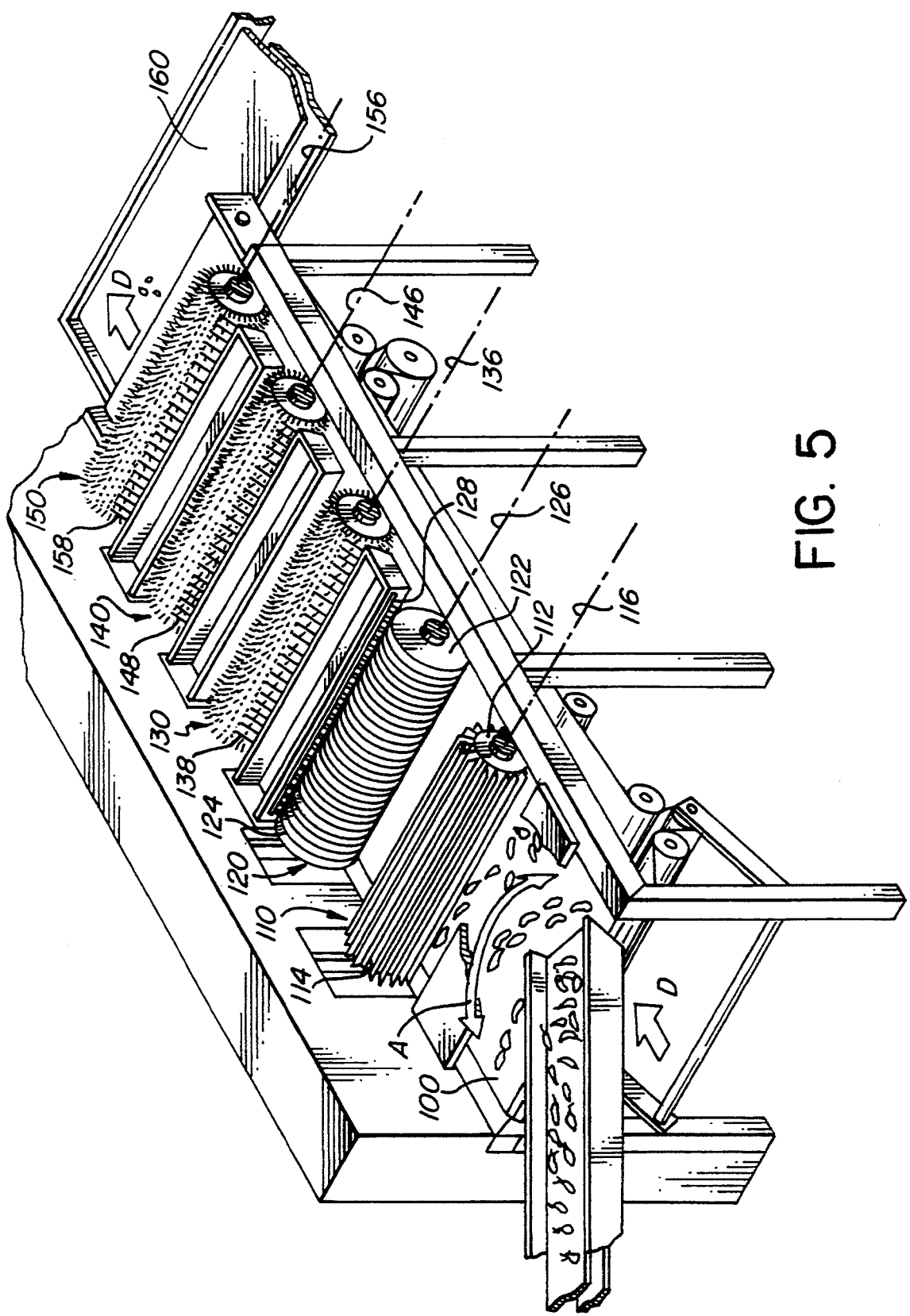
FIG. 5 is an perspective view of a preferred form of the apparatus of the invention.

FIG. 4 shows a conveyor 90 which conveys peppers 10 in direction d and oscillates in arc A to distribute the peppers to form an essentially single layer. Rotary cutting elements at stations 110 and 120, seen in FIG. 5, are positioned with their axes of rotation generally transverse to the direction D of movement of the support conveyor belt 100. The rotary cutting element at station 110 has a central hub 112 from which a plurality of elongated blades 114 extend radially from the longitudinal axis 116 with a sharpened cutting edge at the axial extent of each parallel to the longitudinal axis. The rotary cutting element at station 120 has a central hub 122 around which a plurality of circular cutting blades 124 are positioned generally transverse to the longitudinal axis 126. The sharpened outside peripheral edges of the blades are oriented generally parallel to the direction D. It is possible to reverse the order of the cutters and to employ additional cutting stations, as desired.

The sharpened edges of the blades 114 are spaced at a suitable distance to coarsely cut the peppers on the conveyor 100 transversely to the direction D. The sharpened edges of the blades 124 are spaced at a suitable distance to coarsely cut the peppers on the conveyor 100 parallel to the direction D. Typical spacings for coarse cutting will be within the range of from about 0.5 to about 2 inches, typically from about 1.0 to about 1.25 inches. Preferably, the cutting blades are spaced to cut the peppers into squares of about 1.125 inches on each side. The cutting edges of the blades are preferably incontact with the top of the support conveyor belt at the low points of their travel. If spaced, the spacing should be a fraction of the average thickness of the pepper flesh, e.g. by from about 0.001 to about 0.1 inches.

Figure 7:
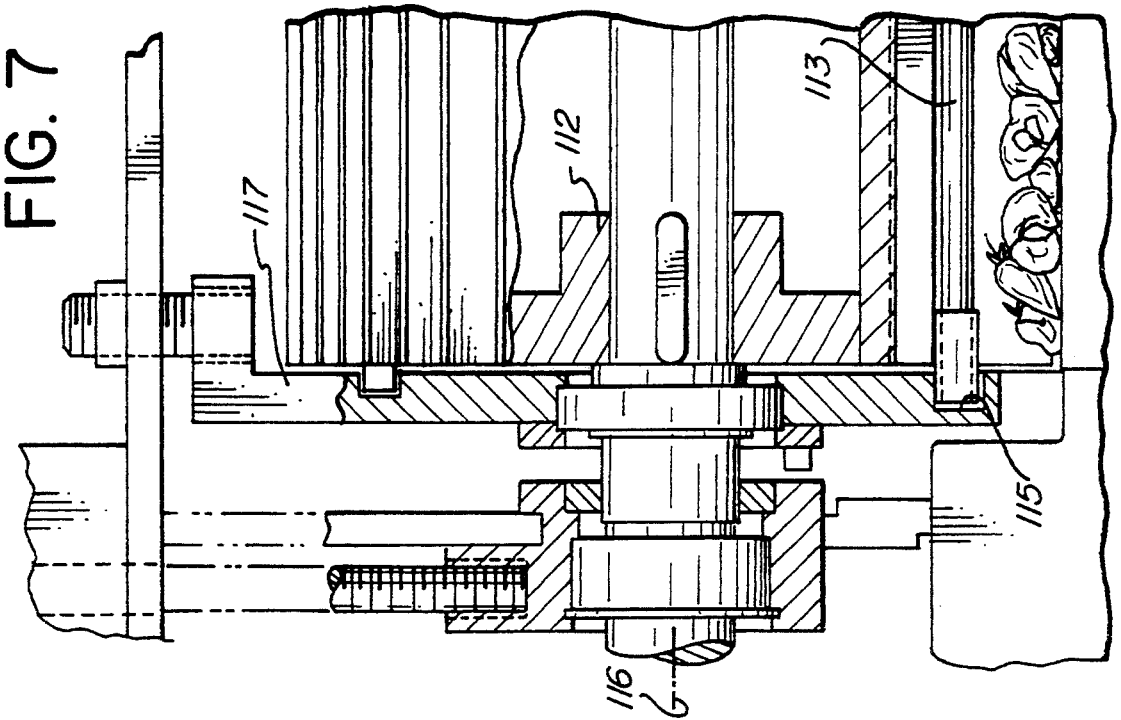
FIG. 7 is a partial sectional view, transverse to the orientation of FIG. 6, showing cam means for moving ejector members between adjacent cutting blades.
Figure 6:
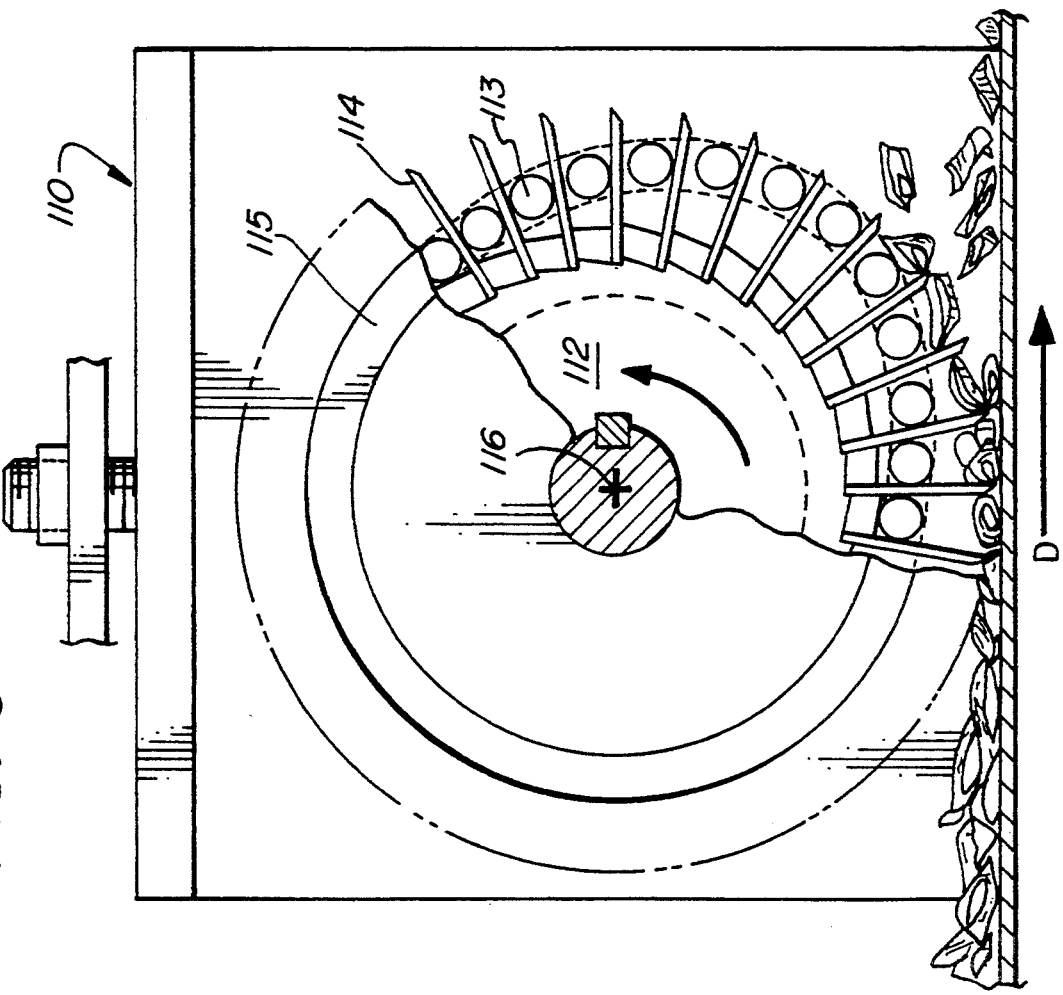
FIG. 6 is a side elevational view, partially cut away, of one of two cutting stations as shown in FIG. 5.

Reference to FIGS. 6 and 7 shows better the construction and operation of cutting station 110. As the radially-extending, elongated cutting blades are rotated about axis 116, elongated ejector members 113 are moved radially between adjacent cutting blades between a withdrawn position when the blades are in the cutting position and an extended position when the blades have moved from the cutting position. Cam tracks 115 are located in side wall members 117. A plurality of elongated ejector members 113 are positioned between pairs of adjacent cutting blades 114 and are supported at opposed ends by cam tracks 115 in stationary side wall members 117 at opposed sides of central hub 112. Upon rotation of the central hub, the ejector members move outwardly following passage through cutting position to eject cut pieces from between said adjacent blades.

Figure 9:
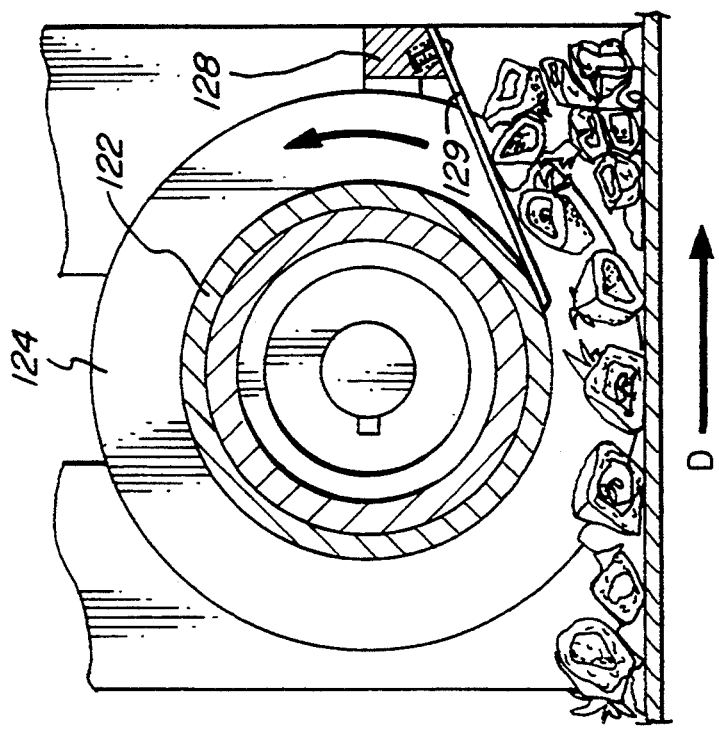
FIG. 9 is a side elevational view, cut away as FIG. 8, to show the operation of comb-like ejector means assuring removal of cut pieces from between adjacent cutting blades.
Figure 8:
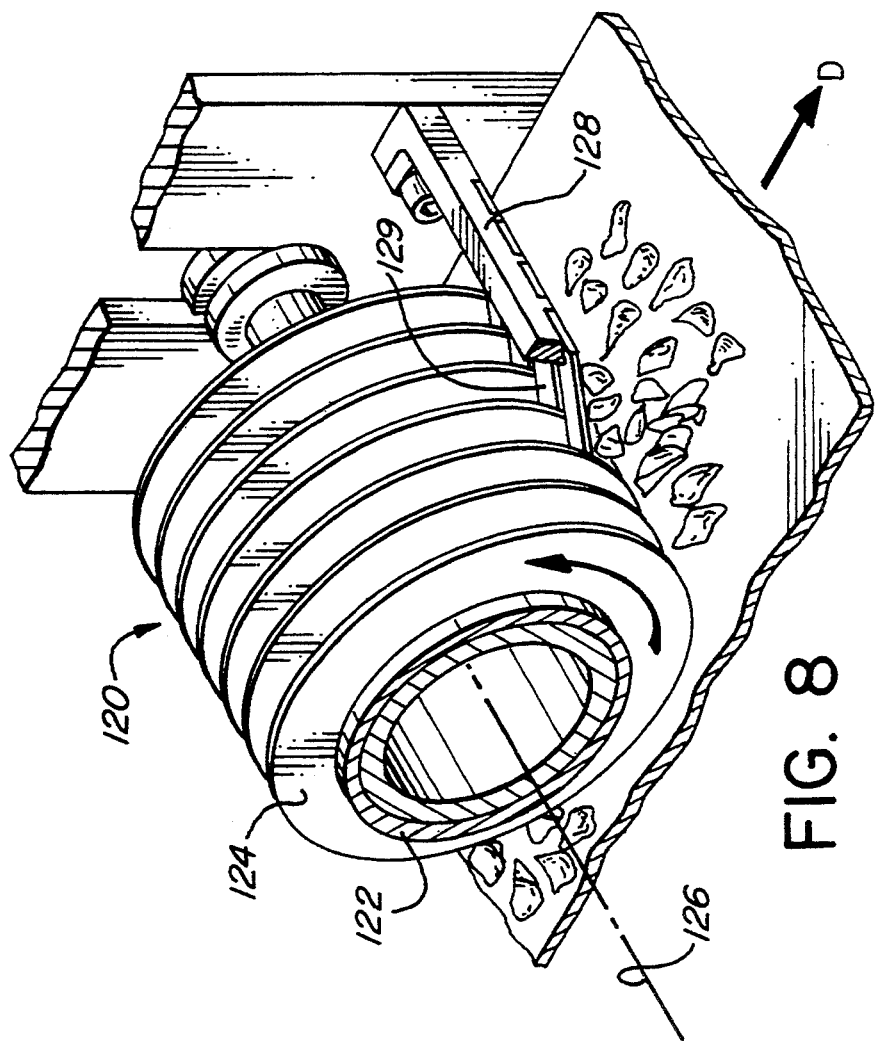
FIG. 8 is a partial perspective view of the cutting means at the other of the two cutting stations shown in FIG. 5, cut away to show the detail of construction.

Reference to FIGS. 8 and 9 shows the other of the two cutting stations, station 120. Central core 120 supports a plurality of circular blades 124. Comb-like means 128 including tines 129 extending between adjacent blades positioned to remove cut pieces from between said adjacent blades 124. As the central core 122 is rotated about axis 126, the peripheral edges of the blades move into and out of cutting position. As they move out of cutting position they are rotated toward means 128, and tines 129 extend between adjacent blades to discharge cut pieces held there.

The linear velocity of the sharpened edges of the blades is preferably the same as that of the belt at a point where the belt is parallel to a tangent to the circle of movement of the sharpened edges of the blades. Typically, for a belt about 11 feet long and about 3.5 feet wide, a suitable linear velocity (angular velocity for the blade edges) will be about 1.5 feet per second. At this rate of speed, from about 10 to about 20 (e.g., about 16) thousand pounds of chili peppers per hour can be conveniently processed. It is preferred to provide inspectors to assure effective waste removal and to pick out waste pieces missed by the apparatus.

Downstream of the cutting stations, the conveyor 100 conveys pieces of flesh and waste, including stem, core, and calyx pieces, toward a series of separation stations 130, 140, and 150. While the drawing in FIG. 5 shows three stations, it is currently preferred to employ two, and it is possible to use a single one. Each of the separation stations includes an elongated cylindrical core, e.g. 132, 142, and 152, supporting a plurality of pins e.g. 134, 144, and 154, extending radially therefrom.

FIGS. 10 through 14 show a representative separation station in greater detail. The pins 134 are positioned in curved plate 135 (shown to have a backing 135') which is affixed to central core 132. The pins 134 have at least sharpened tips at their free ends which are preferably spaced at regular intervals. The diameter of the pins is not known to be critical, but diameters of from about 0.03 to about 0.075 (e.g., about 0.052) inches have been determined to be suitable. Typical spacings will be at a tip-to-tip distance of 5/16 of an inch, in staggered rows. The tips of the pins will preferably be spaced from the top of the conveyor belt support 100, at their lowest point of travel by a fraction of the average thickness of the pepper flesh, e.g. by from about $\frac{1}{4}$ to about $\frac{3}{8}$, and preferably about 5/16, inches.

Means are provided for moving the conveyor 100 and rotating said central cores 112, 122, 132, 142, and 152, can be a single electric motor or other common drive device which provides power through a suitable transmission and appropriate belt or gear drive mechanism. These features are within the skill of the art and are not shown herein. In the preferred embodiment, a common belt and pulley drive is employed to move the conveyor 100 from left to right in the drawing and to rotate each of the cores (e.g., 132 etc.) counter clockwise.

The pins are rotated in a circle (e.g., counter clockwise) about each of the respective axes 136, 146, and 156, transverse to the direction of movement D of the conveyor belt support 100. The linear velocity of the tips of the pins is preferably the same as that of the belt at a point where the belt is parallel to a tangent to the circle of movement of the tips of the pins.

The relative motion of the tips of the pins and the support causes the tips of the pins to impale pieces of flesh and cores on the support and then preferentially withdraw from the pieces of flesh and remain impaled within the cores and other waste, thereby separating the flesh from the cores and other waste. If desired, the relative motion could be achieved by moving pins on differently-shaped supports or by moving a differently-shaped support for the peppers.

Each of the separation stations preferably includes mechanical means to remove the waste from the pins, The drawing shows comb-like devices 138, 148, and 158, each with tines that project between the pins and release the pieces of waste from the pins and drop it into waste chutes 139, 149, and 159, which are flushed with water (by means not shown).

The cut pieces of pepper flesh, substantially freed of waste, are discharged from the end of conveyor 100 onto a further conveyor 160 which carries them to further processing and packaging. Following removal of the tops, the peppers are then blanched and acidified (e.g., to a pH of 3.5 or as desired) prior to dicing to the desired size, e.g. about $\frac{3}{8}$ inch squares, as is known in the art. The diced peppers can be canned immediately or stored in a pickling solution for any desired period of time prior to packaging.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

We claim:

1. A process for preparing cut, cooked peppers, substantially free of core portions, comprising:
   moving a support holding cut, cooked peppers, containing pieces of flesh and core, relative to a plurality of pins having tips to cause said tips of said pins to impale said pieces of flesh and cores; and
   then moving said support for said cut, cooked peppers, relative to said pins, thereby causing said pins to preferentially withdraw from said pieces of flesh and to remain impaled within said cores, thereby separating said flesh from said cores.

2. A process according to claim 1 which includes the further step of:
   mechanically removing said cores from said pins.

3. A process according to claim 1 wherein:
   said support comprises an endless belt having a top surface moving linearly,
   said pins are rotated in a circle about an axis transverse to the direction of movement of said support, and
   said belt and said tips of said pins are moved at the same linear velocity at the point where the belt is parallel to a tangent to the circle of movement of the tips of the pins.

4. A process according to claim 1 which includes the further steps of:
   roasting the peppers whole, including core, stem and calyx, to provide roasted peppers;
   washing and tumbling the peppers after roasting to separate skins therefrom.

5. A process according to claim 4 which includes the further step of:
   distributing the peppers on said support to form an essentially single layer of the roasted peppers; and
   cutting the peppers both parallel to and transversely to the direction of movement of said support.

6. A process according to claim 4 wherein said cut, cooked peppers are conveyed past two sets of rotary-mounted pins.

7. A process according to claim 1 which includes the further step of:
   dicing the pieces of flesh after separation from the pieces of cores.

8. A process according to claim 1 wherein:
   the pieces of flesh are acidified and packaged after separation of said pieces of cores.

9. A process for preparing diced, cooked peppers, substantially free of stems, calyx and cores, comprising:
   roasting whole peppers, including stem, calyx and core, to provide roasted peppers;
   forming an essentially single layer of the roasted peppers on a support moving linearly;
   cutting the peppers both parallel to and transversely to the direction of movement of said support to provide pieces of flesh and pieces of waste, comprising stem, calyx, and core, on said support;
   moving said support and the cut, cooked peppers relative to a plurality of pins having tips to cause said tips of said pins to impale said pieces of flesh and waste;
   then moving said support relative to said pins to cause said pins to preferentially withdraw from said pieces of flesh and to remain impaled within said waste and thereby separate said flesh from said cores; and dicing said pieces of flesh into small pieces relatively free of stems, calyx and cores.

10. A process according to claim 9 wherein said support is a continuous belt conveyor and the peppers are cut by means of rotary cutters.

11. An apparatus for preparing cut, cooked peppers, substantially free of core portions, comprising:
a plurality of pins having tips;
a support for holding cut, cooked peppers, containing pieces of flesh and core;
means for moving said support relative to said tips of said pins to impale said pieces of flesh and cores and to then preferentially withdraw from said pieces of flesh and to remain impaled within said cores, thereby separating said flesh from said cores.

12. An apparatus according to claim 11 which includes:
means for removing said cores from said pins.

13. An apparatus according to claim 11 which further includes:
means for rotating said pins in a circle about an axis transverse to the direction of movement of said support at the same linear velocity as said support at a point where the belt is parallel to a tangent to the circle of movement of the tips of the pins.

14. An apparatus according to claim 13 wherein said support is a continuous belt conveyor.

15. An apparatus according to claim 11 which further includes:
rotary cutters positioned above said support to cut peppers positioned thereon both parallel to and transversely to the direction of movement of said support.

16. An apparatus according to claim 15 which further includes:
means for distributing the peppers on said support to form an essentially single layer of the roasted peppers.

17. An apparatus according to claim 11 wherein:
said pins are rotated about an axis which is transverse to the direction of movement of said support.

18. An apparatus for preparing cut, cooked peppers, substantially free of core portions, comprising:
a support comprising an endless belt having a top surface;
means for moving said top surface of said endless belt linearly;
a plurality of pins having tips, said pins being mounted above said endless belt on a rotary support having an axis of rotation transverse to the direction of movement of said endless belt;
means for rotating said pins in a circle about its axis of rotation at the same linear velocity as said endless belt at a point where the belt is parallel to a tangent to the circle of movement of the tips of the pins;
whereby said support is moved relative to said tips of said pins to impale pieces of flesh and cores on said support and to then preferentially withdraw from said pieces of flesh and remain impaled within said cores, thereby separating said flesh from said cores.

19. An apparatus according to claim 18 which further includes:
means for removing said cores from said pins.

20. An apparatus according to claim 18 which further includes:
means for distributing the peppers on said support to form an essentially single layer of the roasted peppers.

21. An apparatus according to claim 18 which further includes:
rotary cutting means comprising a plurality of circular cutting blades spaced about a central hub having an axis of rotation transverse to the direction of movement of said endless belt.

22. An apparatus according to claim 21 which further includes:
comb-like means including tines extending between adjacent blades positioned to remove cut pieces from between said adjacent blades.

23. An apparatus according to claim 18 which further includes:
a plurality of elongated cutting blades extending radially from a central hub having an axis of rotation transverse to the direction of movement of said endless belt.

24. An apparatus according to claim 23 which further includes:
a plurality of elongated ejector members positioned between pairs of adjacent cutting blades and being supported at opposed ends by cam tracks in stationary side walls at opposed sides of said central hub to, upon rotation of the central hub, cause the ejector members to move outwardly following passage through cutting position to eject cut pieces from between said adjacent blades.

* * * * *